Oct. 4, 1932.　　　　O. G. EDMOND　　　　1,881,400
WOODWORKING MACHINE
Filed Sept. 16, 1929　　　7 Sheets-Sheet 6
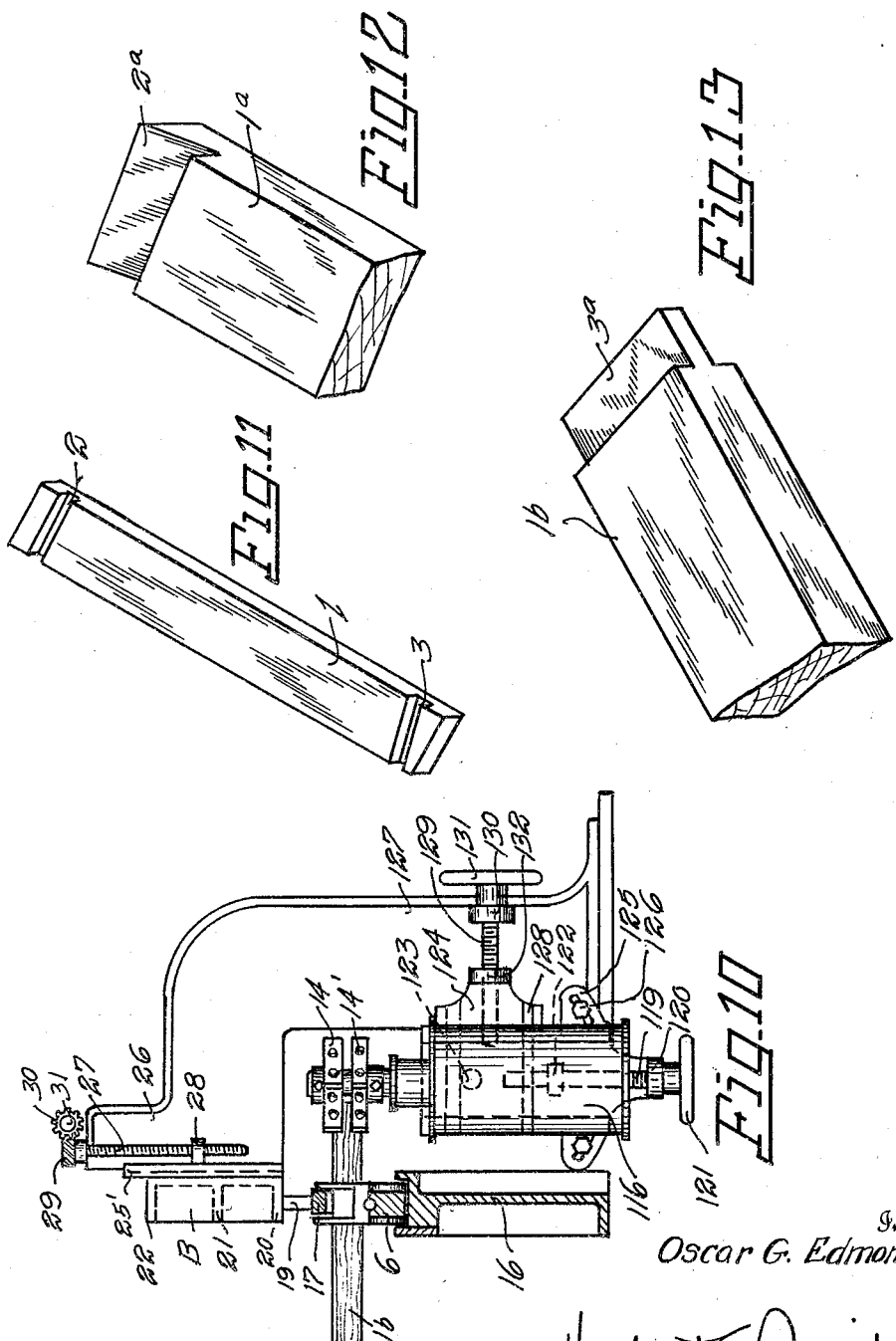

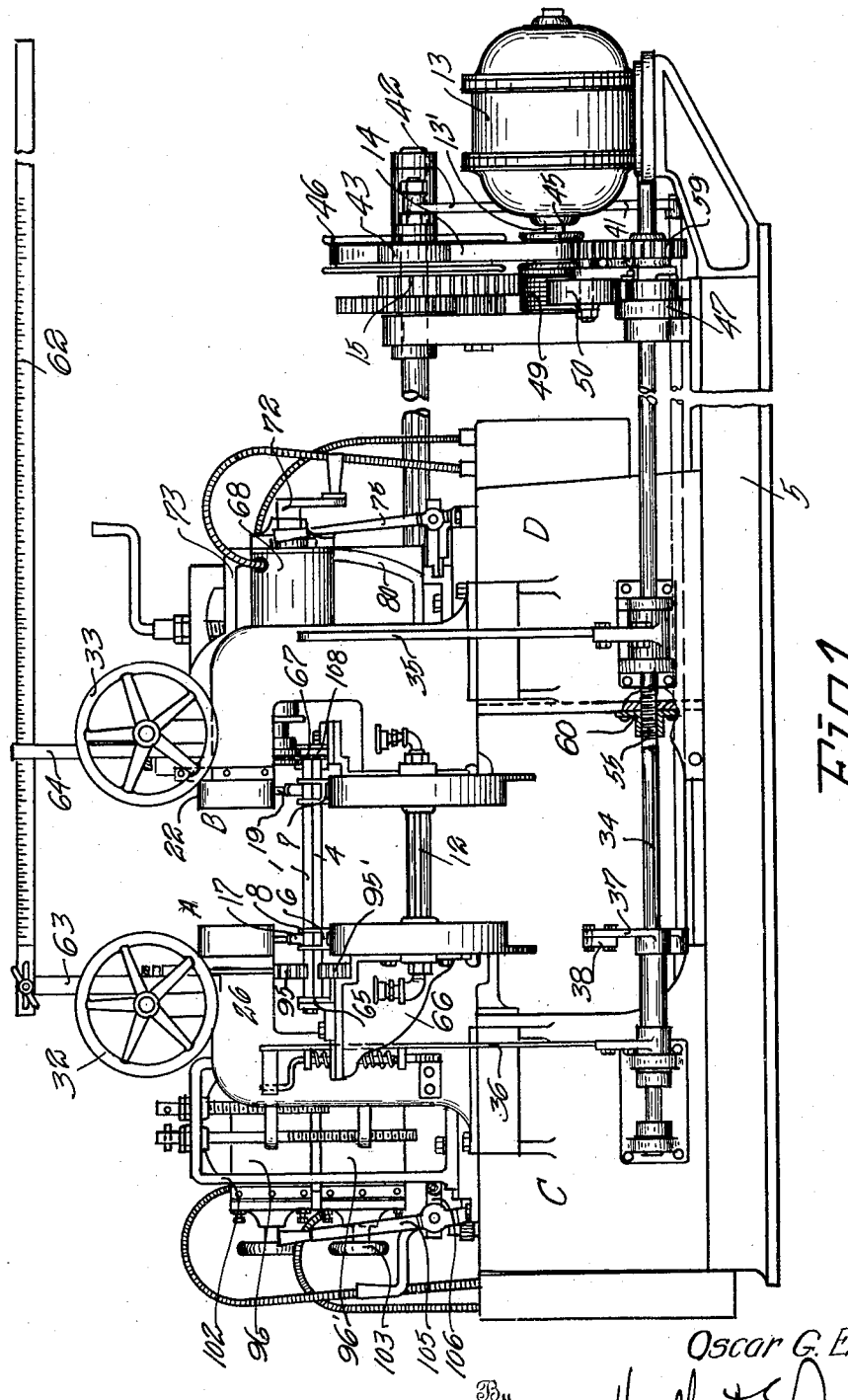

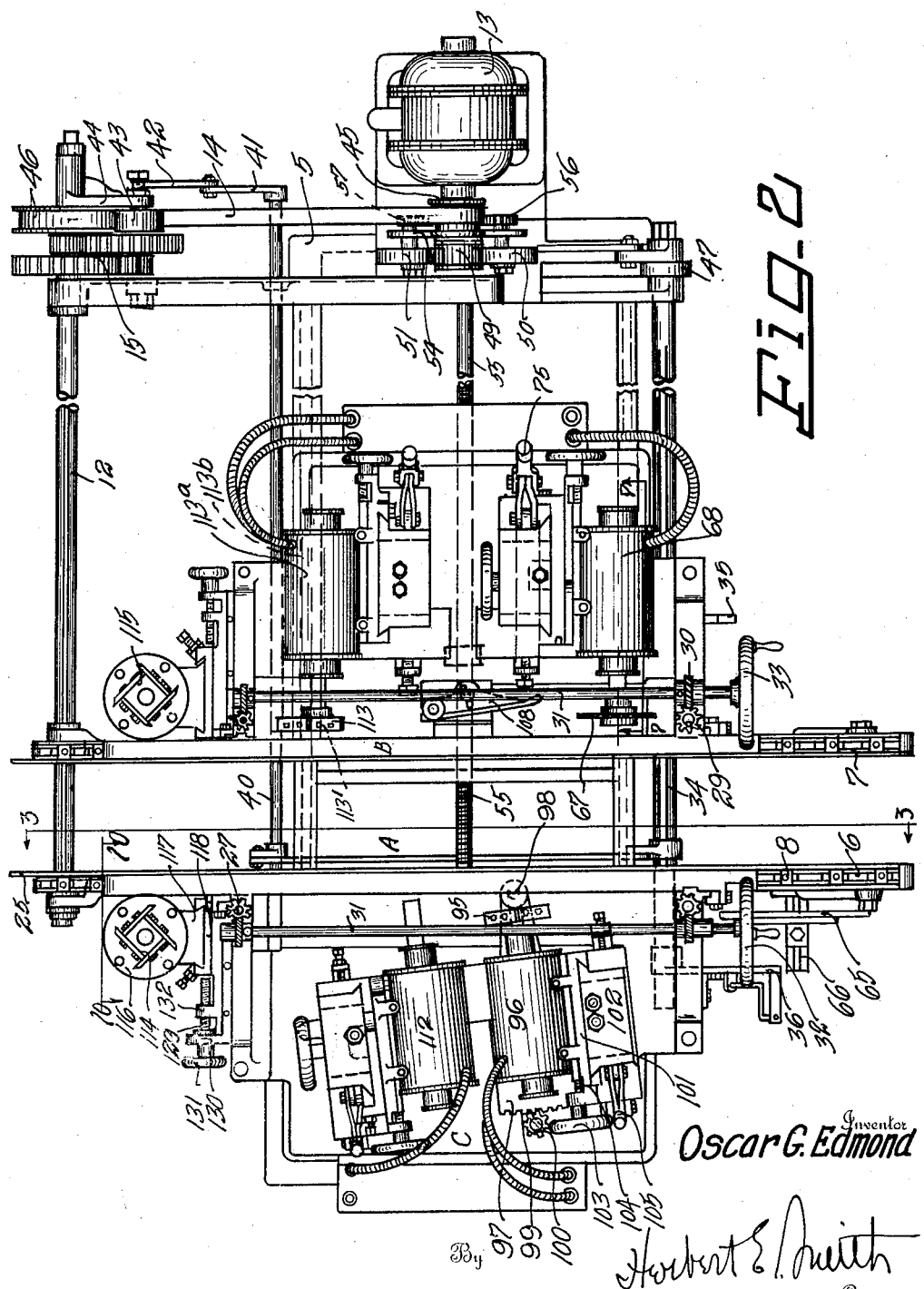

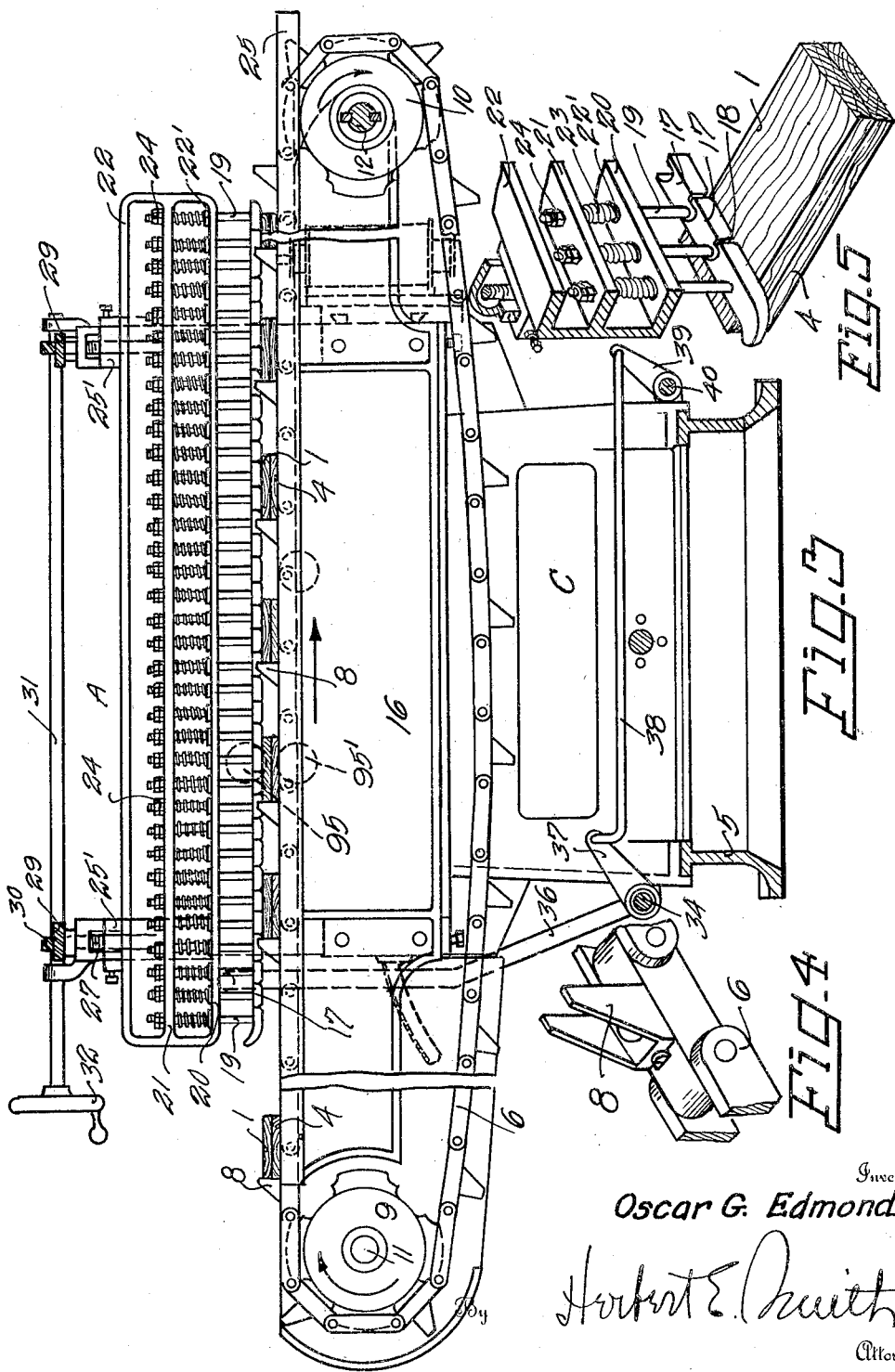

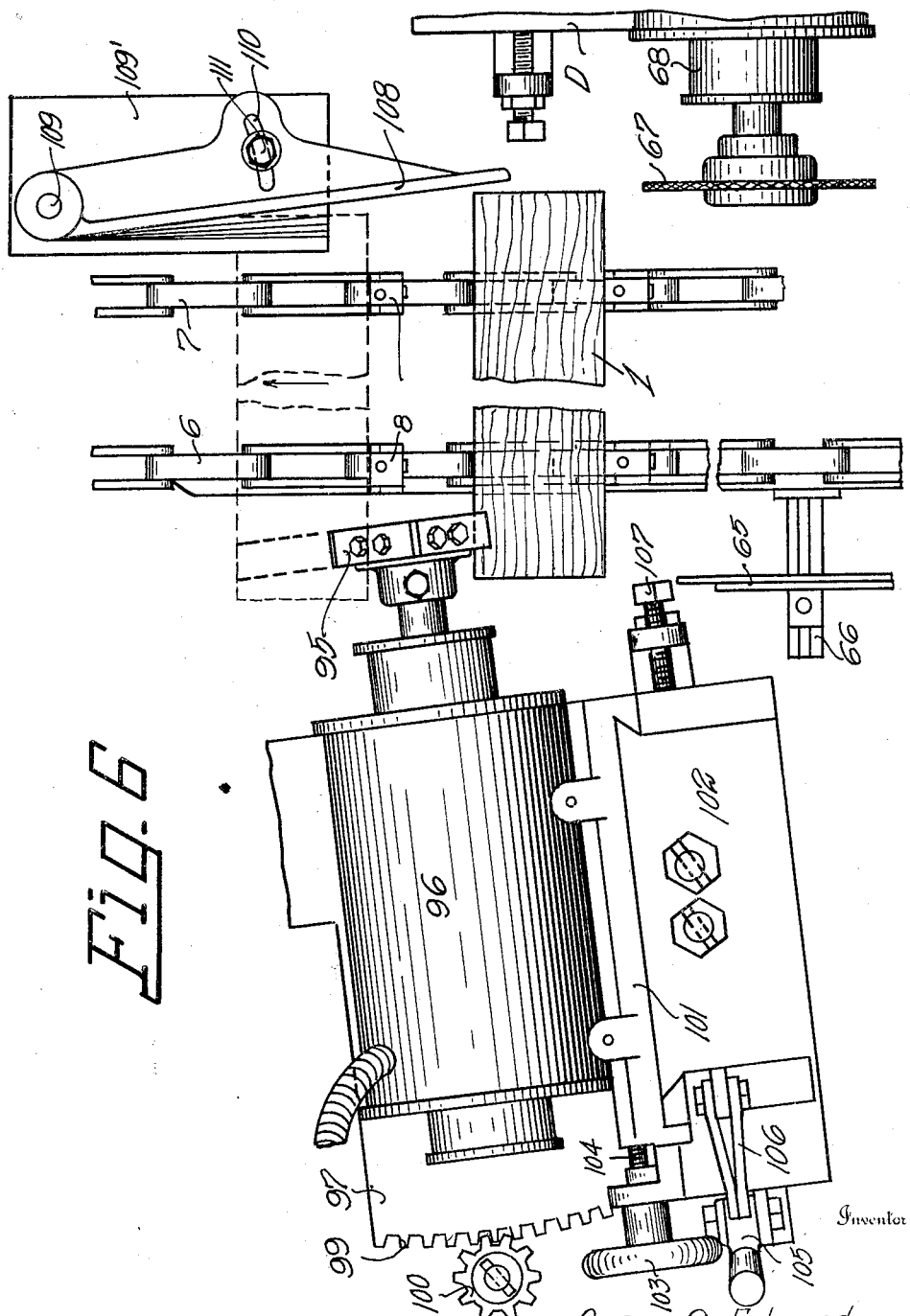

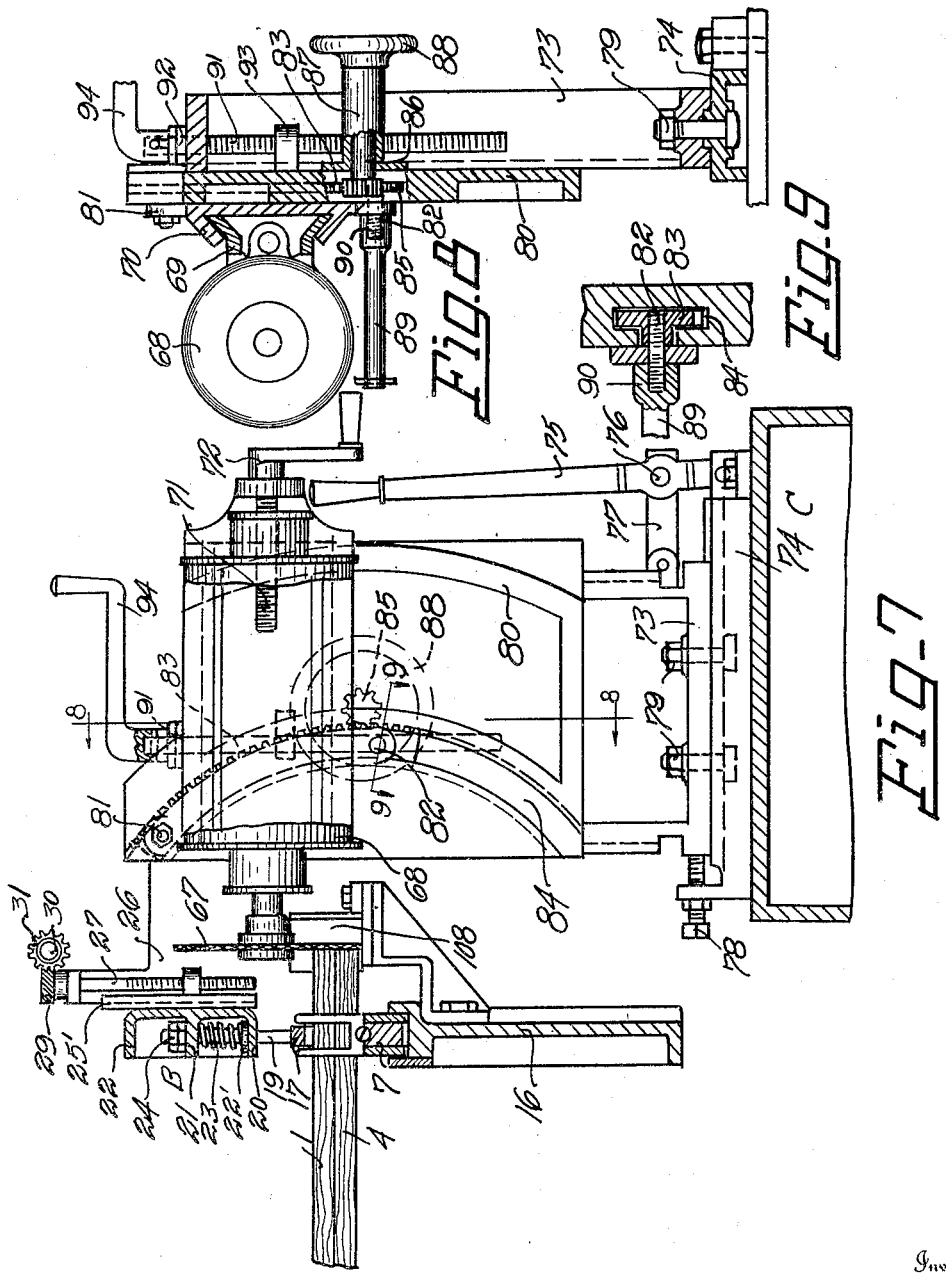

Oct. 4, 1932.   O. G. EDMOND   1,881,400
WOODWORKING MACHINE
Filed Sept. 16, 1929    7 Sheets-Sheet 7

Inventor
Oscar G. Edmond

By Herbert E. Smith
Attorney

Patented Oct. 4, 1932

1,881,400

UNITED STATES PATENT OFFICE

OSCAR G. EDMOND, OF SPOKANE, WASHINGTON, ASSIGNOR OF ONE-HALF TO WHITE PINE SASH COMPANY, OF SPOKANE, WASHINGTON

WOODWORKING MACHINE

Application filed September 16, 1929. Serial No. 392,902.

My present invention relates to improvements in wood working machines of the combined type, and adapted for sawing, tenoning, and mortising, especially in the manufacture of bars or stiles of window and door frames. The machine is equipped with endless duplex feed chains, and presser mechanism co-acting therewith for feeding and guiding successive pairs of stiles which travel broadside through the machine, and present their respective ends to the various machine tools for the different operations.

The machine is adapted to act on the stock or stiles, either singly or in pairs, and in the latter instance the complementary mortises or complementary tenons, at the ends of a pair of stiles, are simultaneously fashioned in the stiles. The stock may be sawed to the exact length required by the use of a rotary saw, and rotary cutters heads are employed for tenoning and mortising the stock; all of these machine tools being independently operated and preferably, with direct drive from electric motors.

Means are provided for angularly adjusting the machine tools, and for longitudinally shifting the stock for the purpose of cutting oblique mortises in the upper and lower stiles of a pair, and means are provided for fashioning an undercut dovetail tenon at the ends of the stiles.

In the formation of the oblique or angular cuts, two pieces of stock, arranged back to back, are fed on a continuous belt, upon which they are rigidly held, and a straight cut is milled, after which the stock is shifted laterally to make the angle cuts, without necessity for personal attention.

The invention consists in certain novel combinations and arrangements of parts involving the feed mechanism for the stock and the machine tools co-operating with the feed mechanism as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention. The machine illustrated has been successfully operating for some time with accuracy, dispatch, and with a workmanship and rapidity of production far superior to all existing machines of this character with which I am familiar.

Figure 1 is a side view of a combined machine embodying my invention, showing a pair of sash bars or stiles being fed therethrough. Figure 2 is a top plan view of the machine, showing the motors and adjustable machine tools operated thereby for selectively cutting, tenoning and mortising the stock as required. Figure 3 is a longitudinal vertical sectional view of the machine at line 3—3 of Figure 2, showing successive pairs of stiles or stock fed broadside through the machine, and the presser mechanism therefor. Figure 4 is a detail perspective view of a portion of one of the duplex feed chains for the stock. Figure 5 is a detail perspective view of a portion of the presser mechanism for the stock, as it is fed through the machine. Figure 6 is an enlarged view showing in elevation one of the motors and its rotary cutting tool, for mortising the upper bar or stile of a pair, with means for longitudinally shifting the stiles in the process of fashioning an oblique mortise. Figure 7 is an enlarged detail vertical sectional view at line 7—7 of Figure 2 showing a rotary saw, with means for adjusting the saw longitudinally and vertically with relation to the stock, and also for tilting the saw. Figure 8 is a detail vertical sectional view at line 8—8 of Figure 7, showing the manually operated means for shifting or tilting the saw, and for vertically adjusting the horizontally movable motor and its tool. Figure 9 is a detail sectional view at line 9—9, showing the rack and pinion device for tilting the saw. Figure 10 is a view in side elevation, showing one of the vertically disposed, adjustable motors and its rotary cutter head, for fashioning a tenon (as in Figure 13) on the end of a stile. Figure 11, is a perspective view of a finished stile having a right angle mortise, and also an oblique mortise adjacent its respective ends. Figure 12 is a perspective view showing one end of a stile having a dovetail tenon, and Figure 13 is a perspective view of a portion of a stile with a straight tenon thereon. Figure 14 is a view in elevation of part of the machine as seen from the right in Figure 1, with parts omitted for convenience of illustration.

In order that the construction, operation and utility of the machine may readily be understood, reference should be had first to Figures 11, 12 and 13, where the stile 1 is shown having a right angle mortise or dado 2, near one end, and an obliquely disposed mortise or dado 3 at the other end. These mortises are cut in the stile or other stock, as the latter passes through the machine, or the stock 1a may have a dovetail tenon 2a cut at its end as in Figure 12, and the stock 1b may have the interlocking tenon 3a cut at its end by the direct, electrically operated machine tools hereinafter referred to.

For convenience of illustration and description the stock will be referred to as stiles, which are fed in pairs as 1 and 4, successively through the machine, as indicated in the various figures of the drawings. A conventional form of machine bed 5 is used to support the operating parts of the machine, and a pair of duplex, endless feed chains or carriers 6 and 7 having complementary spaced, forked, carrier lugs 8, travel with their upper working flights from left to right, as indicated by the arrow in Figure 3. The duplex, spaced feed chains forming the carrier for the work, are supported upon sprocket wheels 9 and 10, having their shafts 11 and 12 journaled in suitable bearings. The shaft 12 is the power shaft which is operated from the motor 13 and its shaft 13', through the belt drive 14 to the gearing 15, as best seen in Figures 2 and 14.

The upper or working flights of the chains travel through and are supported on spaced, grooved guides or bedplates 16 (Figure 7) extending horizontally in the line of travel of the stiles or stock, and the ends of the pairs of stiles, which are supported transversely of and carried by the chains or carrier, are retained or clamped on the carrier by duplex presser mechanism, located and operating above the chains. The complementary presser mechanism for the respective ends of the stiles are indicated as a whole by the letters A and B in Figure 1, and as they are of similar construction, a description of one will suffice for both. The presser mechanism includes a sectional presser bar extending parallel with a chain and located directly above it, and the forked carrier lugs 8 of the chain are adapted to pass under the presser bar with their tines moving along the sides of the sectional bar.

Each sectional presser bar comprises a succession of alined blocks 17 having complementary interlocking ends 18 and suspended rigidly at the lower end of a pin 19. The pins 19 pass upwardly through perforated flanges 20 and 21 (Figure 5) of a housing 22 fixed to the sections C and D of the machine, and springs 23 are coiled about the pins and interposed between flanges 20 and 21 to press the pins and blocks downwardly, shoulders 22' and nuts 24 on the pins being employed to limit movement of the pins. The springs press the sectional presser bar into contact with the transversely disposed pair of stiles, or a single piece of stock, as the case may be, and permit the stock to pass under the successive sections of the bar. The successive pairs of stiles are placed manually, or in other suitable manner, upon and transversely of the carrier at the left in Figure 3, and the finished product is discharged from the guide plates or extensions 25 at the right end of Figure 3.

The duplex presser mechanisms A and B are vertically adjustable, and independently, to various heights, to accommodate various thicknesses of the stock or stiles, and to vary the tension of the spring pressed sectional bar in the performance of its function of retaining the work. For this purpose the housings 22 are provided with grooved plates 25' (Figure 10) that are slidable on the guide heads 26 of the machine, and vertical screw bars 27 are threaded into nuts 28 rigid with the guide plate 25'. The bolts 27 are provided with worm gears 29 at their upper ends, and gears 30 on the shaft 31, together with hand wheels 32 and 33 on these shafts 31, may be turned to elevate or lower the housings which support the presser mechanisms.

The machine is capable of adjustment to accommodate various lengths of stock or stiles, and for this purpose it is provided with two sections C and D, the latter being movable or slidable with relation to the former in the bed-plate 5 of the machine, and transversely of the line of travel of the carrier. By this adjustment the chain 7, presser mechanism B, and other devices and machine tools supported on the machine section D, are bodily moved toward or away from the stationary section C of the machine, and its accessories.

A rock shaft 34, which is also used in connection with the driving mechanism for the carrier chains, is journaled transversely of the chains in bearings on the stationary part of the machine. A lever 35, is pivoted on the rock shaft to manually control the adjustment of the section D with relation to section C, and a lever 36 is fixed to the rock shaft, for manually controlling the driving mechanism of the carrier.

Rock shaft 34 is provided with a crank arm 37, from which extends a link 38 to a complementary crank arm 39 on the rock shaft 40, and a lever arm 41 on this shaft is pivoted to an upright link 42 which supports the belt-tightener roller or pulley 43 journaled on a bracket arm 44 on the shaft 12.

When starting lever 36 is swung to the right in Figure 14, the pulley 43 is pulled down into frictional contact with the belt 14 to tighten it on its pulleys 45 and 46 for the purpose of driving the shaft 12 through the reduction gears 15 to operate the carrier chains.

For adjusting the machine to various lengths of stiles, the lever 35 is used. This lever has a hub 47, notched for engagement by a spring detent 48 to retain it in neutral position on the rock shaft 34. The motor shaft 13' is provided with a friction drive pulley 49, with which either of the driven pulleys 50 or 51 may selectively be engaged by manipulation of the lever 35, which turns a crank arm 52. The crank arm has a slotted, pivoted, lost-motion connection with an arm 53 that is rigidly connected to a bracket 54, and the bracket is pivoted on a screw bar 55 below the motor shaft. The friction pulleys 50 and 51 are journaled in the bracket so that by moving lever 35 to the left in Figure 14, the pulley 50 is brought into frictional contact with the drive pulley or roller 49, and by moving the lever to the right the pulley 51 is brought into contact with the drive pulley 49 to cause the machine section D to be adjusted with relation to the section C.

The pulley 50 is rigid with a pinion 56, and pulley 51 is rigid with a pinion 57, an idler pinion 58 being used which meshes with pinion 57. Pinions 56 and 58 mesh with the main gear 59 on the screw bar 55, and they are used as selective gears in transmitting motion to the main gear 59 and screw bar 55 when either of the friction drive devices is coupled with friction pulley 49. The screw bar 55 is journaled in suitable bearings on the bed plate of the machine, and it has a threaded bearing as 60 (Figure 1) in a portion of the adjustable section D, whereby, when the bar is turned the section D is moved relatively to the stationary section C.

In Figure 1 a scale beam 62 is shown supported at one end from a fixed bracket 63 on the stationary section C, and the beam passes through a slotted guide post 64 on the adjustable section D to indicate the length of the stile to be provided, and the adjustment of the movable section D with relation to the section C.

The stiles are supported at their ends by the carrier chains 6 and 7 and they are guided by means of a laterally adjustable guide plate 65 (Figures 1 and 6) supported on brackets 66 of the stationary section C of the machine, said plate terminating adjacent to the machine tools to permit access to the stiles by the tools.

If the stiles are of such length as to require cutting, the right end of the stock, as it is fed through the machine from the near side in Figure 2, is cut off by means of a rotary saw 67, supported on the movable machine section D. As best seen in Figures 7, 8, and 9, the saw is operated by means of an electric motor 68, and the saw and its motor are adjustable vertically, horizontally, and at an angle to the perpendicular with relation to the stiles or stock. For horizontal adjustment, the motor is provided with a dovetail slide plate 69 fixed thereto at one side, and slidable in the complementary guide plate 70, and an adjusting screw 71 having a handle 72 and co-acting with the side plate and guide plate, may be used for close screw adjustment of the saw. For the initial horizontal adjustment of the saw, however, an open, grooved, upright frame 73, which supports the slide plate and guide plate, as well as the motor, is slidable upon the fixed bed plate 74 secured on the machine bed plate or section D. By the use of a hand lever 75, which is pivotally supported at 76 on the stationary plate 74 and linked at 77 to the slide frame, the latter may be moved, and a set bolt 78 in the stationary bed plate is used to stop the frame in proper position. Clamp bolts 79 are also used to securely clamp the slidable frame in its bed plate, after proper adjustment of the parts. The slide frame is first adjusted to approximate position by manipulation of the lever 75, and then the close adjustment is secured by means of the screw 72.

For tilting the machine tool to position to cause the saw to cut at an angle to the perpendicular, a carrier plate 80 is supported on the open frame 73, and the motor 68 is tiltable relatively thereto. The motor frame or its guide plate 70 is bolted at 81 and 82 to an arcuate rack bar 83, which is movable in an undercut arcuate groove 84 in the plate 80. A pinion 85 on the shaft 86 is journaled in a boss 87 of the carrier plate 80, and a hand wheel 88 on the shaft is turned to swing the motor and its tool with relation to the slotted or grooved carrier plate.

A locking tool or wrench 89 having a socket head 90 for engagement with the bolt 82 is used to clasp the motor and its saw in the tilted adjusted position.

For vertical adjustment of the carrier plate 80 and the motor and machine tool carried thereby, a vertically disposed screw bar 91 is journaled at 92 in the frame 73, and coacts with the nut or threaded lug 93 projecting from the carrier plate 80, and it will be apparent that by turning the handle 94 of the screw bar, the carrier plate may be slid vertically with relation to the frame 73. These three adjustments, i. e. vertically, horizontally, and at an angle to the perpendicular, may be accomplished with other machine tools, as for tenoning and mortising, in addition to the rotary saw 67 and its direct connected motor 68, in the performance of other operations of the machine on the stile or stock.

After the machine has been adjusted for the desired length of stiles, and the latter have been sawed to the desired length, the stiles are fed forward to a rotary cutter head 95, and as here illustrated, the upper face of the upper stile, and the lower face of the lower stile, are fashioned with oblique mortises as 3, in Figure 11 and by dotted lines in Figure 6, the mortising cuts being performed simultaneously, near the ends of the pair of stiles. The upper mortise is cut by the rotary cutter head 95, and the complementary mortise at the inner side of the lower stile is cut by a rotary cutter head 95', indicated by dotted lines in Figure 3.

The machine tool of which the rotary cutter head 95 forms a part, for cutting the mortise in the lower stile, is a duplicate of that employed for cutting the mortise 3, and it is located directly beneath the machine tool that cuts the mortise 3. Each of these machine tools is provided with a direct drive electric motor, as 96, in Figures 2 and 6.

The complete unit of the machine, of which the machine tool (motor 96 and rotary cutter head 95) forms a part, is supported upon a swiveled base plate 97, which is pivoted at 98 at a suitable point on the stationary section of the machine, as seen in Figure 2, and this plate is fashioned with an arcuate rack edge 99 with which a pinion 100 meshes. The pinion is journaled in suitable bearings in the stationary part of the machine or section C, and when manually rotated, by suitable means, causes the plate and machine tools supported thereon to swing on the swivel or pivot point 98 to adjust the cutter head of the tool or tools to the proper angle for cutting the obliquely disposed mortise in the stile.

The motor 96, and the motor 96' of the tool directly beneath it, are supported on a vertically slidable plate 101 having dovetail flanges, and this plate is supported on the flanged head 102. A hand wheel 103 and its screw bar 104, disposed in horizontal position, and supported in the head portion 102, are utilized for elevating or lowering the slide plate 101 with relation to its guide head 102, for vertically adjusting the position of the cutter head 95, and the complementary cutter head directly beneath it, with relation to the pair of stiles to be mortised.

The head 102 is adjustable in a horizontal plane toward and from the stile to be mortised, by means of an adjustable lever 105, which lever is pivoted to the swivel plate, and linked at 106 to the horizontally slidable head 102, and a set bolt 107 is used as a stop for the head.

During the operation of cutting the oblique mortises in the upper and lower faces of the respective stiles 1 and 4, it is necessary that the pair of stiles be moved longitudinally with relation to the carrier or feed chains, to the left in Figure 6, after they pass the end of the guide plate 65. For this purpose I employ a flanged shifting plate 108, which is alined parallel with the cutting plane of the rotary cutter 95 of the machine tool. The shifting plate is pivoted at 109 on a suitable support rigid with section D of the machine, and has an arcuate slot 110 for co-action with a clamp bolt 111 in the support 109'. The shifting plate may thus be adjusted in the path of movement of the right ends of the pair of stiles, as the latter advance toward the shifting plate in Figure 6, and these ends contact with and slide along the face of the shifting plate which is located directly opposite to the rotary cutter head 95. By this sliding contact of the stiles with the shifting plate, the stiles are shifted to the left the required distance to permit the cutter head to mortise the stile as indicated by dotted lines in Figure 6.

The swiveled base plate 97 also supports a machine tool, or a pair of vertically arranged machine tools, of which a motor indicated at 112 in Figure 2 provides the power, and as this machine tool is substantially the same as that operated by the motor 96, a detailed description is unnecessary.

For cutting a dovetail tenon as 2a on the stile 1a in Figure 12, a rotary cutter head 113 (Figure 2) may be used. This cutter head is directly operated by the motor 113a, and the complementary cutter head 113' is operated by a motor 113b, the machine tools being mounted in manner similar to the motor 68 for the saw 67 on the section D of the machine, and these machine tools are adjustable vertically, horizontally, and at an angle to the perpendicular with relation to the stile 1a for the purpose of cutting the dovetail tenon thereon.

For cutting the stright tenon 3a at the ends of the stile 1b in Figure 13, the rotary cutter heads 114 and 115, located at opposite sides of the carrier, near the discharge end of the machine, are adapted for use. The cutter head 114, which also includes a second cutter head 114', is supported on the stationary section C of the machine, and the cutter head 115 is supported on the movable section D of the machine. The machine tools of which these heads form a part, are of duplicate construction, and a description of one will suffice for both.

Upon reference to Figure 10, it will be seen that the double rotary cutters 114 and 114', forming the horizontally disposed, rotary cutter head that fashions the tenon, are directly driven from an electric motor 116, which is attached to a vertically slidable dovetailed plate 117 movable relatively to the complementary base late 118, which has guide flanges for the beveled edges of the slide plate.

For vertically adjusting the machine tool a screw bar 119, journaled in a bracket 120 on the base plate and provided with a hand wheel 121, is threaded in a nut or threaded lug 122 on the slide plate 117. By turning the hand wheel it will be apparent that the rotary cutter head, or pair of heads, may be adjusted to the desired height for operation on the end of a stile, as it passes the cutters, in the formation of the tenon as indicated in Figures 10 and 13.

The machine tool is also capable of being tilted to present the cutters, singly, to the stile in the formation of a tenon as in Figure 12. For this purpose, the base plate 118 is pivoted or swiveled at 123 on a horizontally adjustable slide plate 124, and the base plate near its lower end is provided with lugs having arcuate slots 125, through which pass bolts 126 to the frame portion 127, which supports the machine tool from section C. The base plate may be swung on its pivot to bring the cutter head to the desired angle, and then the bolts 126 are used to clamp the plate in adjusted position.

The horizontally slidable plate 124 is supported to slide in flanges 128 of the frame 127, and a screw bar 129, journaled in a bracket 130 of the frame 127 and provided with a hand wheel 131, is threaded in a nut or threaded lug 132. This nut is rigid with the slide plate 124, and as the hand wheel is turned, the tool may be slid toward or away from the stile.

It will be apparent from the above description taken in connection with my drawings that the various operations of the combined machine may be performed on the stiles or stock with accuracy and rapidity, and the machine is capable of turning out the completed articles either singly or in pairs. The several machine tools, which are independently operated by individual, direct-drive electric motors, may selectively be used as required, or suitable combinations of the tools may be used in succession on the stiles as they are fed through the machine.

Having thus fully described my invention, what I claim as new and desire to secure by Letters Patent:—

1. In a wood working machine including a rotary grooving cutter, the combination with a pair of spaced, endless, continuously moving parallel chains having carrier lugs thereon, and complementary presser mechanism for co-action with said chains, of a pivoted guide plate located opposite the cutter and adapted to be adjustably swung to position oblique to the line of travel of the chains, and means for retaining said plate in adjusted position in the path of movement of one end of the work whereby the work is shifted longitudinally while the cutter is operating thereon, the cutter being likewise adjustable to cause its cutting plane to intersect the surface of the work in a line parallel to the adjusted position of the pivoted guide plate.

2. In a wood working machine, the combination with a stationary section having a rotary grooving cutter thereon, a laterally adjustable section, a continuously moving endless carrier supported on each section, and presser mechanism for co-action with said carriers, of a pivoted guide plate supported on the adjustable section opposite to said cutter, and a clamping bolt for co-action with a slot in the pivoted guide plate for retaining the plate in position in the path of movement of the work to shift the latter transversely of the carriers while the cutter is operating, the cutter being adjustable to cause its cutting plane to intersect the surface of the work in a line parallel to the adjusted position of the pivoted guide plate.

In testimony whereof I affix my signature.

OSCAR G. EDMOND.